United States Patent [19]

Johnson

[11] 4,240,203

[45] * Dec. 23, 1980

[54] FLEXIBLE SAW

[76] Inventor: Robert M. Johnson, 11 Jana Dr., Weston, Conn. 06883

[ * ] Notice: The portion of the term of this patent subsequent to Mar. 11, 1997, has been disclaimed.

[21] Appl. No.: 85,549

[22] Filed: Oct. 17, 1979

Related U.S. Application Data

[63] Continuation of Ser. No. 947,017, Sep. 29, 1978, Pat. No. 4,193,188.

[51] Int. Cl.³ .............................................. B23D 45/00
[52] U.S. Cl. ................................ 30/166 R; 145/31 R
[58] Field of Search ........... 145/31 R, 31 AB, 31 AC; 30/166 R, 355

[56] References Cited

U.S. PATENT DOCUMENTS

| | | | |
|---|---|---|---|
| 2,696,228 | 12/1954 | Bowen | 145/31 R |
| 2,749,949 | 6/1956 | de la Tramerye | 145/31 R |
| 2,752,964 | 7/1956 | Prusinski | 145/31 R |
| 2,988,118 | 6/1961 | de la Tramerye | 145/31 R |
| 3,192,973 | 7/1965 | O'Link | 145/31 R |
| 3,747,652 | 7/1973 | Meadows | 145/31 R |
| 4,193,188 | 3/1980 | Johnson | 145/31 R |

FOREIGN PATENT DOCUMENTS

| | | | |
|---|---|---|---|
| 954370 | 6/1949 | France | 145/31 R |
| 41720 | 11/1907 | Switzerland | 145/31 R |

*Primary Examiner*—Othell M. Simpson
*Assistant Examiner*—J. T. Zatarga
*Attorney, Agent, or Firm*—Allen D. Brufsky

[57] ABSTRACT

This invention pertains to means for trimming tree branches. Spaced cutting collars with sharp teeth at one end are crimped upon a flexible cable. Lead weights, sand bags, etc., are attached to and carry the flexible cutting cable into position over the branch to be cut. The cable and cutting collars are oscillated to saw the branch.

7 Claims, 3 Drawing Figures

FLEXIBLE SAW

This application is a continuation application of U.S. Ser. No. 947,017, filed Sept. 29, 1978 now U.S. Pat. No. 4,193,188.

This invention pertains to means for and a method of trimming branches of trees and particularly branches high above the ground, by means of spaced cutting collars with sharp teeth at one end fastened upon a flexible cable, without a pole saw, climbing the tree or using a ladder. Means are also provided in the form of metal weights, sand bag, etc. to carry the flexible cutting cable into position over the branch desired to be cut.

Referring to the drawing broadly:

Figure 1:
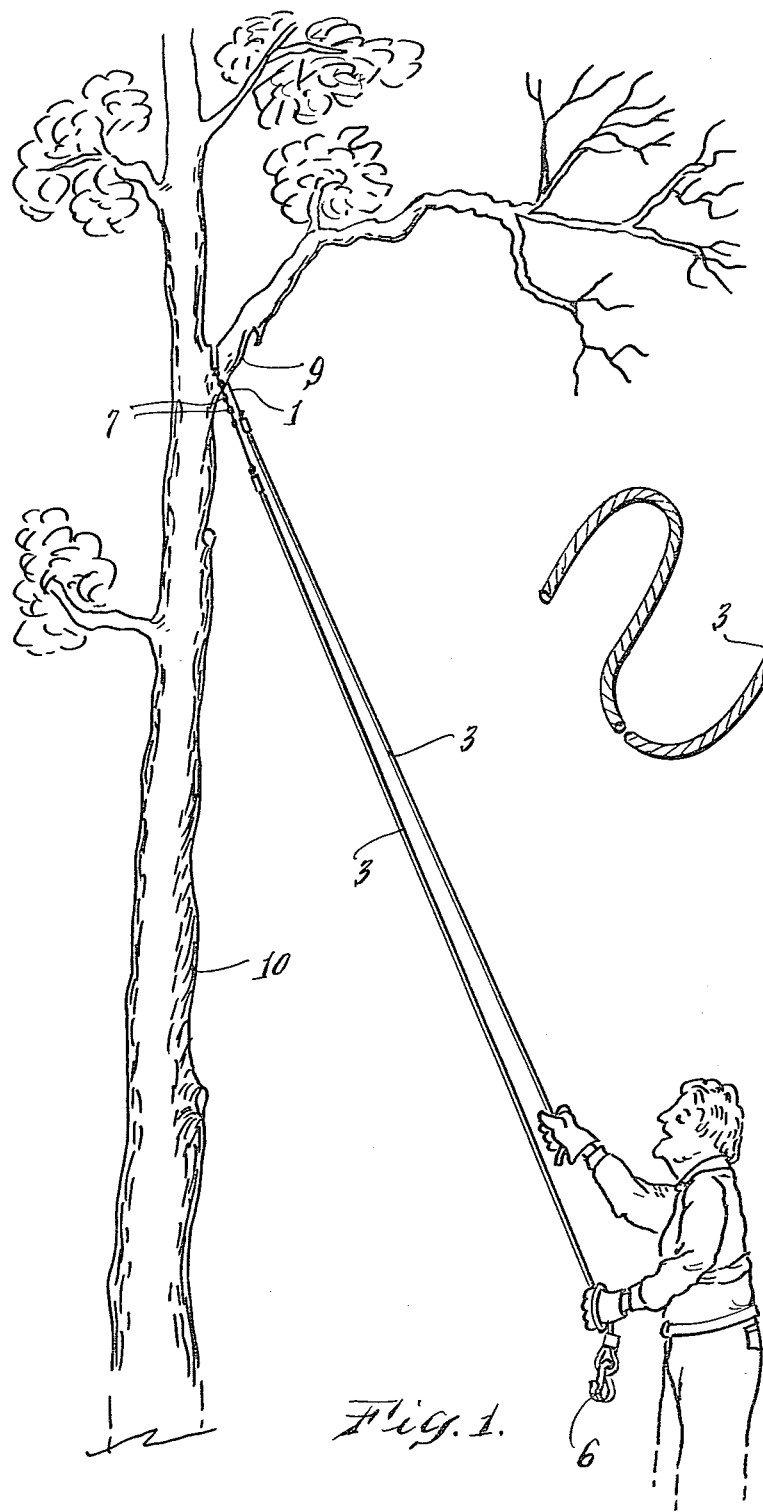
FIG. 1 illustrates my cutting assembly in operation on a tree.
Figure 2:
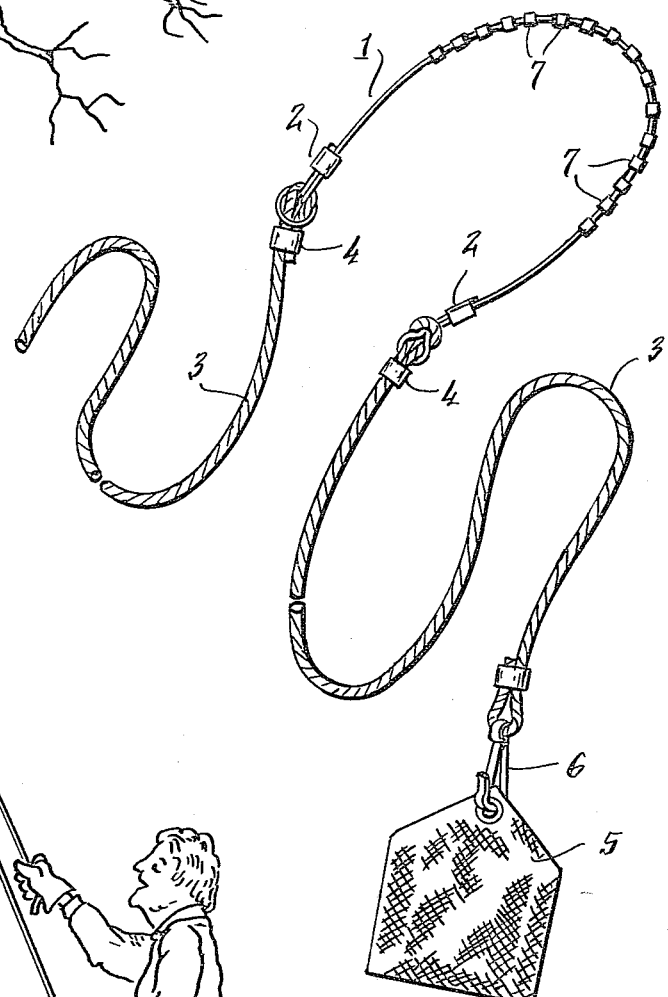
FIG. 2 is a detail view of the complete sawing mechanism together with the throwing and positioning weight.

The primary purpose of this invention is to reach and saw through tree branches which are too high for conventional sawing methods, i.e., pole saws, power and hand saws used in conjunction with ladders or with tree climbing.

The main body of the cutting blade is preferably constructed from flexible stranded wire cable 1. The diameter of this cable or wire rope can vary. However 1/16" seems to be the most practical and satisfactory for most operations. The length of the cable also can vary but about 3 feet seems best for most cutting jobs. Both ends of the cable are doubled back and with the use of crimps 2, a loop about 1½ inch is formed at each end to which control ropes 3 of polypropylene, hemp, nylon, or other suitable material are attached in any suitable manner such as with similar looped ends crimped by elements 4, or other fastening elements.

These ropes 3 serve as flexible handles. The length of the two control ropes also can vary depending on the normal height of the offending tree branches above the ground. At the end of one control rope, a temporary weight 5 of approximately 13 to 16 ounces is attached by means of a snap 6 or other fastner so as to detachably hold the weight hereto. The weight may be a bag of sand or lead pellets, solid block of metal or lead or other relatively heavy substance.

The size, type, and configuration and number of collars 7, and of its special saw teeth 8, are a very important part of my invention. For best results the collars are 0.125' long, have an outside diameter of 0.122" and an inside diameter of 0.068". 22 gauge 1018 carbon cold drawn steel tubing, 12L14, or equivalent is best. The tubing end is shaped by means of files, or otherwise cutting, to form two V-shaped grooves cut at a 60° angle to each other and forming 4 sharply pointed and tapered teeth. The length of tubing is cut-off at about ⅛-3/32" (0.125-0.1875") from the pointed ends of the teeth and is then ready to be strung and swaged to the 1/16" cable.

Figure 3:
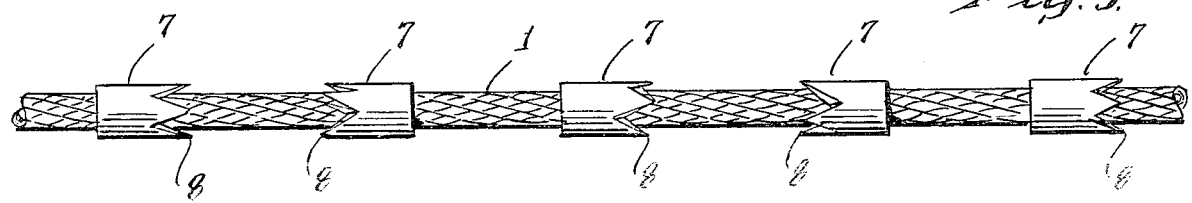
FIG. 3 shows the details of the unique cutting collars.

The collars are crimped onto the cable, back-to-back and points to points as shown in FIG. 3 with a space of approximately ¼-⅜" between cutting collars. Two teeth constitute a set since each tooth will cut when drawn in the forward direction toward which that tooth faces, while the back edge of the other tooth is cleared of sawdust. Hence my flexible saw will cut in both backward and forward i.e. up and down, strokes.

The number of cutting collars, and the length of cable and control ropes used may be varied within limits depending upon the height above ground of the branches to be cut-off, thickness of branches, etc. For example, for the homeowner's model for branches nearer the ground and 4" or less in diameter, each control rope is 25' long, and the cable is 3' long with 40 cutting collars thereon spread over the central 14½", for a total length of 53'. The professional model has control ropes of 35', and a cable length of 5' with 100' teeth thereon, for a total length of 75'. Obviously slightly larger teeth may be used for the heavier cutting if desired. The only limitation to the height of cutting is how far the rope can be thrown over the particular branch.

Method of Use: Once the branch 9 on tree 10 has been selected to be cut, the weight 5 at one end of the control rope is cast up and over the branch. With one control rope in either hand the saw blade is then pulled up and onto the branch. Once the blade saw is positioned the weight may be removed. Now by pulling alternately on both control ropes the blade is pulled back and forth over the branch. With each pass, the cutting teeth take their bite—until the branch 9 has been sawed through.

As mentioned above, the size and positioning of the teeth is very important. Preferably two sets of teeth should not be in contact with the branch at the same time or binding may sometimes occur. Thus, different saw blades with different teeth spacing are recommended for different diameter branches. The thicker the branch, the further apart the teeth should be positioned for optimum cutting. Obviously teeth could be formed on each end of the collars if so desired.

While the preferred form of my invention involves a cable with separate cutting collar crimped thereto and specifically to cut high tree branches, it is within the spirit of claims of my invention to cut any object, and to use less efficient cutting instrumentalities. Among these would be a cable covered with a resinous adhesive, and then coated with sharp abrasive particles, such as silicon dioxide, aluminum oride, or other cutting points secured to the basic cable.

What is claimed is:

1. A flexible saw for sawing high branches from trees comprising:

a flexible cutting area, and flexible holding means on each end of the flexible cutting area to oscillate the cutting area against a branch of a tree to be cut, said cutting area including:

a flexible base member and a series of spaced apart cutting elements secured thereto, each of said spaced apart cutting elements having cutting teeth on one end thereof and a smooth surface on an opposite end thereof, the teeth on every other one of said cutting elements facing toward one end of said flexible base member and the teeth of each of said cutting elements in between every other one of said cutting elements facing towards the opposite end of said flexible base member such that the ends of each of said cutting elements having the teeth face each other and the ends of each of the cutting elements having the smooth surface face each other, whereby teeth on each of said cutting elements facing in said one direction will cut when the cutting area is drawn in said one direction, and the teeth on each of said cutting elements facing in the other direction will be cleared of debris, and when the cutting action is reversed, vice-a-versa.

2. The flexible saw in accordance with claim 1 wherein each of the teeth on every other one of said cutting elements face a space between a pair of teeth on an adjacent one of said cutting elements in between every other one of said cutting elements.

3. The flexible saw in accordance with claim 1 wherein said base member is a cable.

4. The flexible saw in accordance with claim 3 wherein said cutting teeth are on collars frictionally secured on said cable, said collars having teeth solely on one end thereof.

5. The flexible saw in accordance with claim 3 wherein said cutting area cable has loops formed thereon at each end, and generally similar loops are formed on one end of each of said holding means and joined to a loop on one end of said cable, whereby said cutting area and said holding means are permanently secured together.

6. The flexible saw in accordance with claim 1 including a weight detachably secured to an end of one of said holding means.

7. The flexible saw in accordance with claim 3 wherein said holding means is longer than the cutting area cable.

* * * * *